United States Patent
Anderson

(10) Patent No.: US 6,896,455 B2
(45) Date of Patent: May 24, 2005

(54) ROTATABLE MACHINE SPINDLE INCLUDING A GAS SPRING IN WHICH A LUBRICANT-CONTAINING GAS IS CONFINED

(75) Inventor: Ken Anderson, Årsunda (SE)

(73) Assignee: Sandvik AB, Sandviken (SE)

( * ) Notice: Subject to any disclaimer, the term of this patent is extended or adjusted under 35 U.S.C. 154(b) by 42 days.

(21) Appl. No.: 10/462,600

(22) Filed: Jun. 17, 2003

(65) Prior Publication Data

US 2004/0033116 A1 Feb. 19, 2004

(30) Foreign Application Priority Data

Jun. 17, 2002 (SE) .............................................. 0201827

(51) Int. Cl.$^7$ ................................................ B23B 31/30
(52) U.S. Cl. ..................... 409/233; 409/232; 267/64.11
(58) Field of Search ................................ 409/233, 231, 409/232, 135, 136; 408/239 R, 240; 267/64.11, 130, 119

(56) References Cited

U.S. PATENT DOCUMENTS

| | | | |
|---|---|---|---|
| 3,118,345 A | | 1/1964 | Bullard, III et al. |
| 4,863,324 A | | 9/1989 | Blessing |
| 4,884,899 A | * | 12/1989 | Schwartzman ............... 409/233 |
| 4,986,704 A | | 1/1991 | Narushima et al. |
| 5,052,436 A | | 10/1991 | Bauch et al. |
| 5,327,979 A | | 7/1994 | Du et al. |
| 5,562,373 A | * | 10/1996 | Willingham et al. ......... 409/136 |
| 5,707,186 A | | 1/1998 | Gobell et al. |
| 5,865,578 A | | 2/1999 | Benedikter et al. |
| 5,979,911 A | | 11/1999 | Rinne |
| 6,722,827 B1 | * | 4/2004 | Anderson ................... 409/233 |
| 2002/0149140 A1 | * | 10/2002 | Kitaura ....................... 267/130 |

FOREIGN PATENT DOCUMENTS

| | | |
|---|---|---|
| DE | 34 23 060 | 1/1986 |
| DE | 38 24 580 | 1/1990 |
| DE | 38 24 581 | 1/1990 |
| DE | 43 39 439 | 3/1995 |
| WO | WO 00/59666 | 10/2000 |

OTHER PUBLICATIONS

European Search Report dated Sep. 11, 2003.

* cited by examiner

*Primary Examiner*—Derris H. Banks
*Assistant Examiner*—Dana Ross
(74) *Attorney, Agent, or Firm*—Burns, Doane, Swecker & Mathis, LLP

(57) ABSTRACT

A machine spindle includes a rotatable casing in which a clamping device is mounted. The clamping device includes a drawbar for securing a cutting tool. The drawbar is axially displaced by a gas spring which includes a chamber in which a lubricant-containing gas medium is confined. A piston includes a head slidable within a cylindrical upper portion of the chamber, and a rod extending through a lower portion of the chamber and connected to the drawbar. The lower portion of the chamber is non-cylindrical and widens upwardly to promote the upward travel of lubricant toward the piston and upper seals under the effects of centrifugal force during rotation of the spindle.

21 Claims, 4 Drawing Sheets

ROTATABLE MACHINE SPINDLE INCLUDING A GAS SPRING IN WHICH A LUBRICANT-CONTAINING GAS IS CONFINED

TECHNICAL FIELD OF THE INVENTION

This application claims priority under 35 U.S.C. §§ 119 and/or 365 to Patent Application Ser. No. 0201827-3 filed in Sweden on Jun. 17, 2002 the entire content of which is hereby incorporated by reference.

The present invention relates to a gas spring for use in a clamping device on a machine spindle, whereby said clamping device comprises a drawbar, and clamping members arranged at one end of the drawbar in order to clamp a part of a tool coupling at said end. The gas spring, which exerts an axially directed force or bias on the drawbar in a direction away from the clamping members, comprises a housing, a piston axially displaceable in the housing, as well as a gas medium contained in the housing. The invention also relates separately to a clamping device employing the gas spring, as well as to a machine spindle employing such a clamping device.

PRIOR ART

A clamping device is previously known from SE-C-515 002 (corresponding to WO 00/59666), which comprises a gas spring, wherein the space that confines the gas medium has a generally cylindrical shape. A lubricant is added to the gas medium in order to lubricate the seals included in the gas spring. If the gas spring is vertically oriented, the uppermost positioned seal will not obtain sufficient lubrication, since the gas medium/lubricant will not reach up to the uppermost positioned seal upon rotation of the gas spring. That is, during rotation of the gas spring, the gas medium/lubricant will be effected by centrifugal force, which advantageously induces the gas medium/lubricant to "climb" along the internal cylindrical wall of the gas spring. However, this climbing does not proceed so far that the gas medium/lubricant reaches up to the uppermost seal.

AIMS AND FEATURES OF THE INVENTION

An aim of the invention is to provide a gas spring which obviates the above-described shortcoming.

Another aim is to provide a gas spring which is better able to distribute lubricant along its axis especially to an upper end thereof.

A primary aim of the present invention is to provide a gas spring of the type defined above, which in a vertical working position, guarantees lubrication of the seal/seals disposed between a housing and a piston of the gas spring that are positioned in an area of the end of the piston that has a maximum diameter.

Another aim of the present invention is to keep the constructional design of the gas spring no more complicated than that in the prior art.

At least the primary aim of the present invention is realized by a gas spring which comprises a housing forming a chamber in which a piston and a lubricant-containing gas medium are disposed. The piston defines a longitudinal axis and includes a head disposed within a first end portion of the chamber for sliding movement therein along the axis. The piston also includes a rod which projects axially from the head and extends through a second portion of the chamber and emerges from the chamber. The gas medium is arranged to be compressed by the head in response to movement of the head toward the second end portion of the chamber. The first end portion of the chamber is defined by a cylindrical surface, and the second end portion of the chamber is defined by a non-cylindrical surface that widens toward the first end portion of the chamber.

Due to the widening configuration of the second portion of the chamber, lubricant within the chamber is better able to move upwardly toward the first portion of the chamber (and thereby lubricate the piston head), under the effects of centrifugal force.

The gas spring is preferably part of a clamping mechanism for clamping a tool, and the clamping mechanism is preferably disposed within a machine spindle capable of rotation.

DESCRIPTION OF THE DRAWINGS

The objects and advantages of the invention will become apparent from the following detailed description of preferred embodiments thereof in connection with the accompanying drawing and in which like numerals designate like elements.

DESCRIPTION OF PREFERRED EMBODIMENTS OF THE INVENTION

Figure 1:
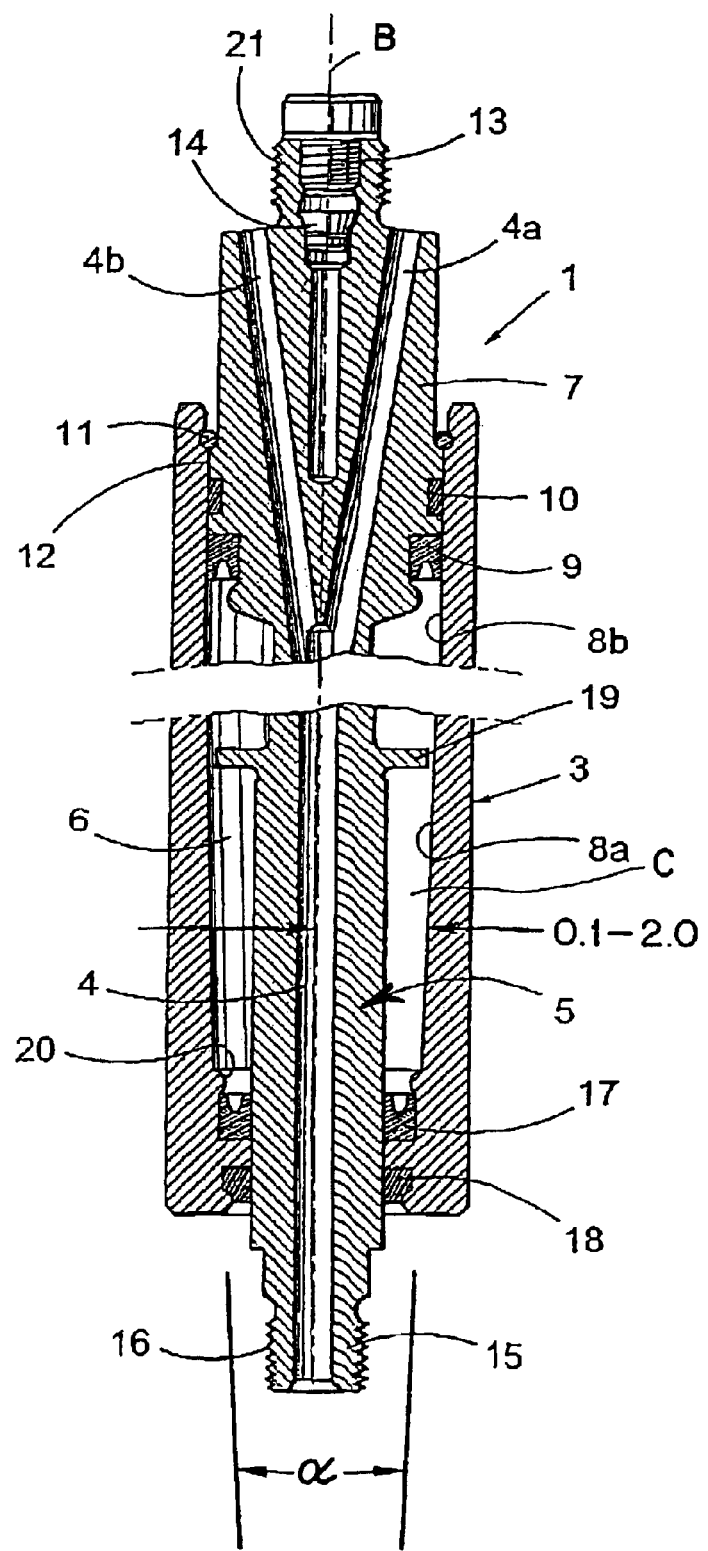
FIG. 1 shows a longitudinal cross-section through a first embodiment of a gas spring according to the present invention.
Figure 4:
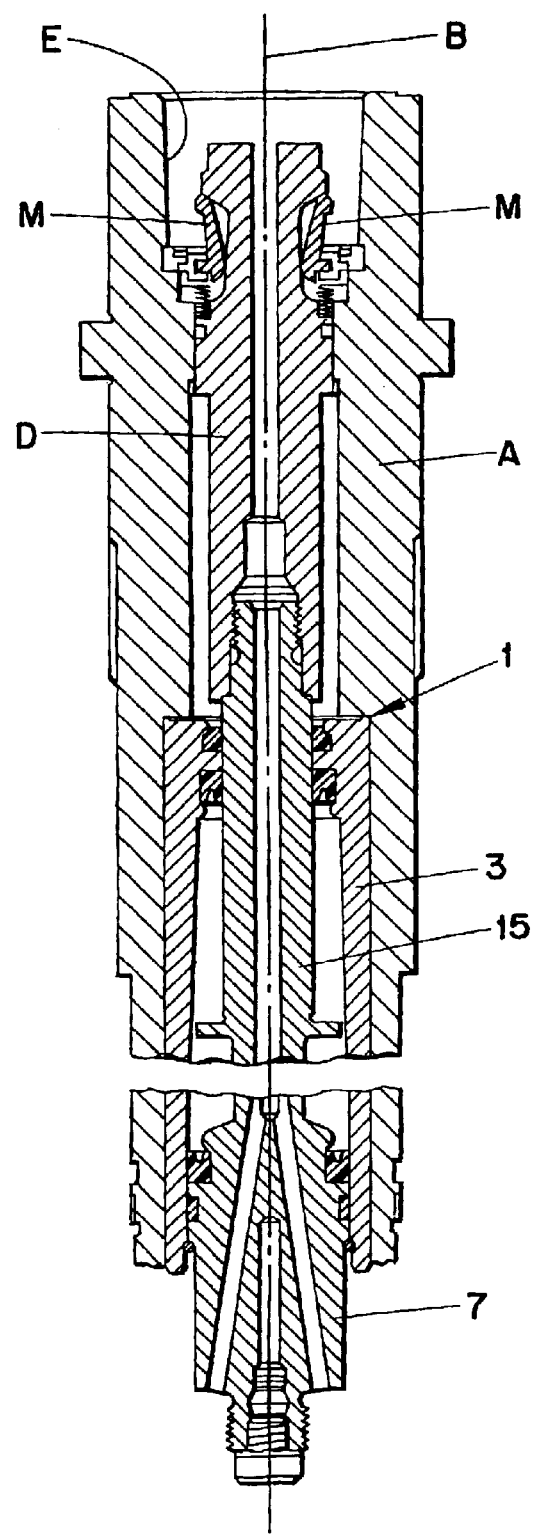
FIG. 4 shows the gas spring of FIG. 1 connected to a conventional clamping device that is mounted in a conventional machine spindle.

The gas spring 1 according to the present invention, illustrated in FIGS. 1 and 4, comprises a generally cylindrical housing 3, which is intended to be received in a casing A of a machine spindle that can rotate about a vertical axis B. The full length of the gas spring is not shown in FIG. 1. As for the other components included in a machine spindle, as well as the operation thereof, reference is made to SE-C-515 002, corresponding to U.S. application Ser. No. 09/937,380, filed Dec. 13, 2001, now U.S. Pat. Ser. No. 6,722,827whereby the contents of which are hereby incorporated by reference in the present description.

Within a first or upper portion of a chamber C of the housing 3, a displaceable piston 5 is arranged, which at the upper end thereof has a first cylindrical end portion or head 7, which is sealed against the internal limiting wall of the housing 3 via first and second seals 9 and 10, respectively, which are carried by the piston and extend around the circumference of said first cylindrical end portion 7. The seals 9 and 10 have the purpose of sealing the space between the first cylindrical end portion 7 and the internal surface of the housing 3 against a gas medium 6 contained in the gas spring 1, which gas medium is normally at a pressure of 150 bar. The piston 5 has a first central, through-duct 4 for conducting cooling medium, which duct divides into two diverging part ducts 4a and 4b in the area of the first cylindrical end portion 7.

The first cylindrical end portion 7 extends out through the housing 3. Generally, the first cylindrical end portion 7 has a greater diameter than the rest of the piston 5. In order to prevent the piston 5 from being displaced too far out of the housing 3 in the upward direction in FIG. 1, an adjusting ring 11 is arranged in the housing 3, whereby a shoulder 12 running round the circumference of the first cylindrical end portion 7 can abut against this adjusting ring 11. In the area of the free end thereof, the first cylindrical end portion 7 carries a screw 13 that seals a filling nipple 14 for the gas medium 6 contained in the housing 3. Generally, the first end portion 7 is intended to be connected to a push rod (not shown) via a first external screw thread 21 in the area of the free end of the first end portion 7. Said push rod would be displaceably received inside the casing A of the machine spindle, whereby reference in this connection is made to SE-C-515 002 for further information of the constructive structure of the machine spindle.

The piston 5 has a second cylindrical end portion or rod 15 extending projecting from the head 7 and extending through a second or lower portion of the chamber C before emerging from the chamber through the lower end of the housing 3. Said second cylindrical end portion 15 has a second external thread 16 at the free end thereof, which is intended to be connected to a drawbar D, which at the end thereof that faces away from the second end portion 15, is provided with clamping members M for engagement in a known way with a tool (not shown) positioned within a recess E of the casing A.

The housing 3 is provided with third and fourth seals 17 and 18, respectively, at the lower end thereof in FIG. 1, which extend around the circumference of the piston 5 and have the purpose of sealing the space between the piston 5 and the internal surface of the housing 3 against the gas medium 6 contained in the gas spring 1.

A radially protruding, circumferential flange 19 is arranged on an intermediate portion of the piston 5, whereby said flange 19 constitutes a stop shoulder when the piston 5 is displaced downwards in FIG. 1. Said flange 19 thereby comes to abutment with an internal stop 20 of the housing 3 which protrudes into the path of the piston 5. The stop 20 extends along the internal circumference of the housing 3 adjacent to the third and fourth seals 17 and 18.

According to a presently preferred procedure, machine spindles, with the appurtenant gas springs 1, are initially manufactured and delivered in an "unloaded" state, i.e. without the pressurized gas medium 6. The reason for this is that gas springs 1 of the kind in question cannot be transported by aviation if they contain gas medium that has a pressure in the range of 150 bar, according to the current regulations. Gas springs 1 are normally "loaded" before they are delivered to the customer, whereby said gas springs 1 for this reason are provided with a filling nipple 14, see FIG. 1 or 3, or the like. Said nipple 14 may naturally also be used in case the pressure of the gas medium 6 needs to be maintained or checked.

A characteristic feature of the gas spring 1 according to the present invention is that the internal chamber in the housing 3, i.e. the chamber that contains the gas medium 6, is defined by a limiting surface, which along a lower portion 8a thereof in FIG. 1 widens in the upward direction. Alternatively, this may be expressed as the lower portion 8a of the surface widening in the direction of the end portion 7 of the piston 5 that has the larger cross-section. The surface portion 8a is conical in FIG. 1, so the widening takes place continuously. As is seen in FIG. 1, half of the cone angle a of the surface portion 8a should be within the interval 0.1°–2.0°, so the full cone angle α should be in the range 0.2–4.0°. An upper portion 8b of the chamber surface is cylindrical, which is necessary in order for the first and second seals 9 and 10 to function in a satisfying way.

Due to the fact that the lower portion 8a has an upwardly widening conical cross section, the lubricant mixed into the gas medium will more easily ascend along the surface portions 8a and 8b inside the housing 3 when the spindle casing/clamping device/gas spring unit rotates about the axis B, which ensures that the lubricant also lubricates the first and second seals 9 and 10, which are positioned at the top in the housing 3 in FIG. 1.

Figure 2:
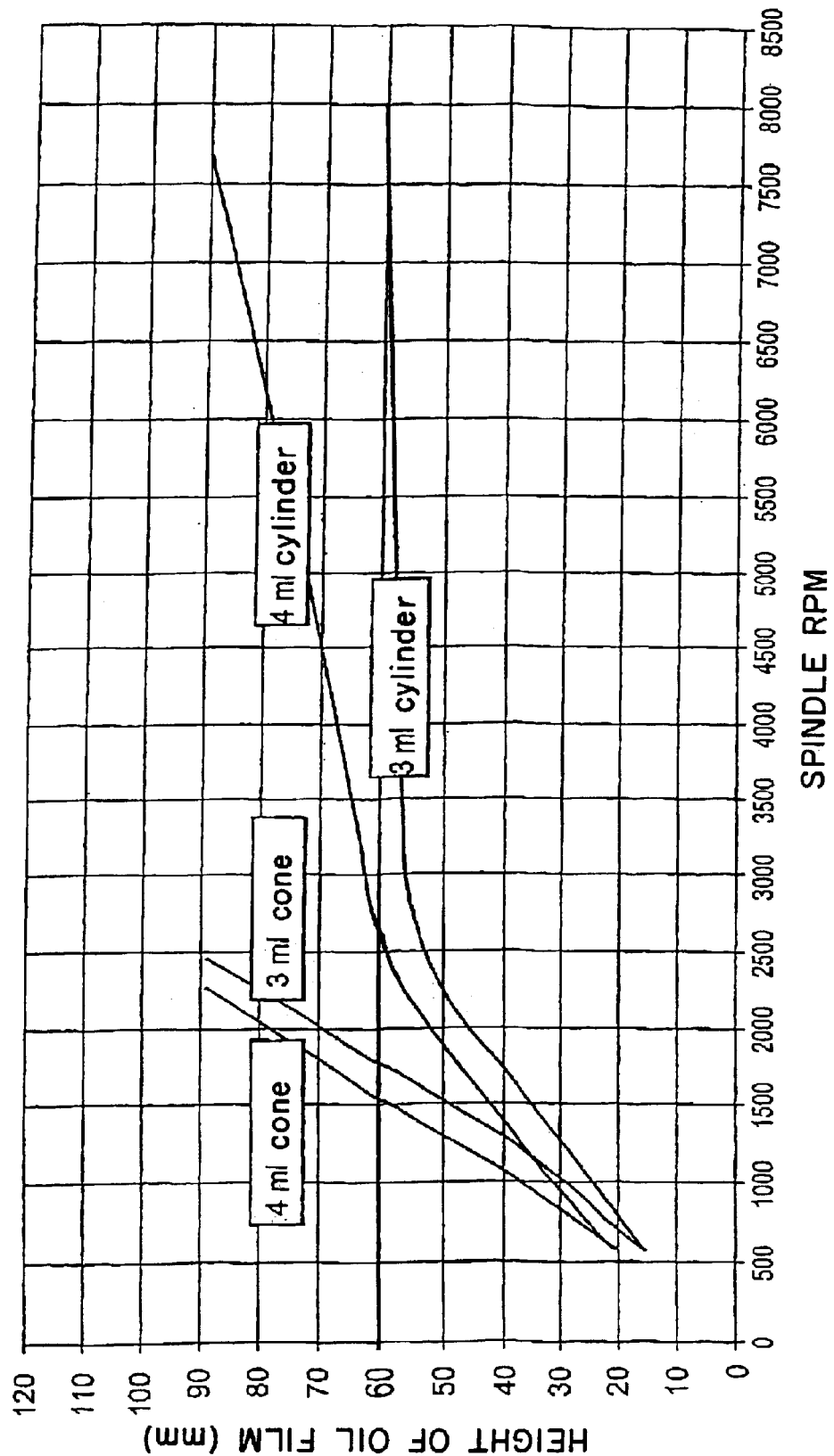
FIG. 2 shows a diagram of how high the oil film rises in different designs of the housing of the gas spring as a function of the spin.

In order to confirm the significance of the fact that the inner surface 8a, 8b of the chamber of housing 3 is at least partly conical and widens upwards in FIG. 1, reference is made to the diagram in FIG. 2, where empirical, comparative experiments with a gas spring according to the present invention, as well as a gas spring according to prior art, are compared. In this diagram, the height in mm of the oil film on the interior of the housing 3 is given on the vertical axis, i.e. how high the oil film rises on the chamber surface 8a, 8b. On the horizontal axis, the rpm of the gas spring, and thereby also for the machine spindle, is given. On studying the diagram in FIG. 2, it will be realized that in a comparison of an internally conical housing 3 of the invention with an internally cylindrical housing of the prior art, the oil film rises considerably higher in a conical housing 3, see for instance the speed of 2000 rpm wherein there occurs a difference in height of approx. 25 mm.

The significance of the quantity of lubricating oil that has been added is also illustrated in FIG. 2. Generally, a lubricating oil quantity of 4 ml, by comparison with a lubricating oil quantity of 3 ml, gives an increase of the height of the oil film of fully 5 mm. However, in this connection, it should be pointed out that the adding of lubricating oil has to be kept at a relatively low level, since the compressibility of the gas medium decreases with increased lubricating oil.

Figure 3:
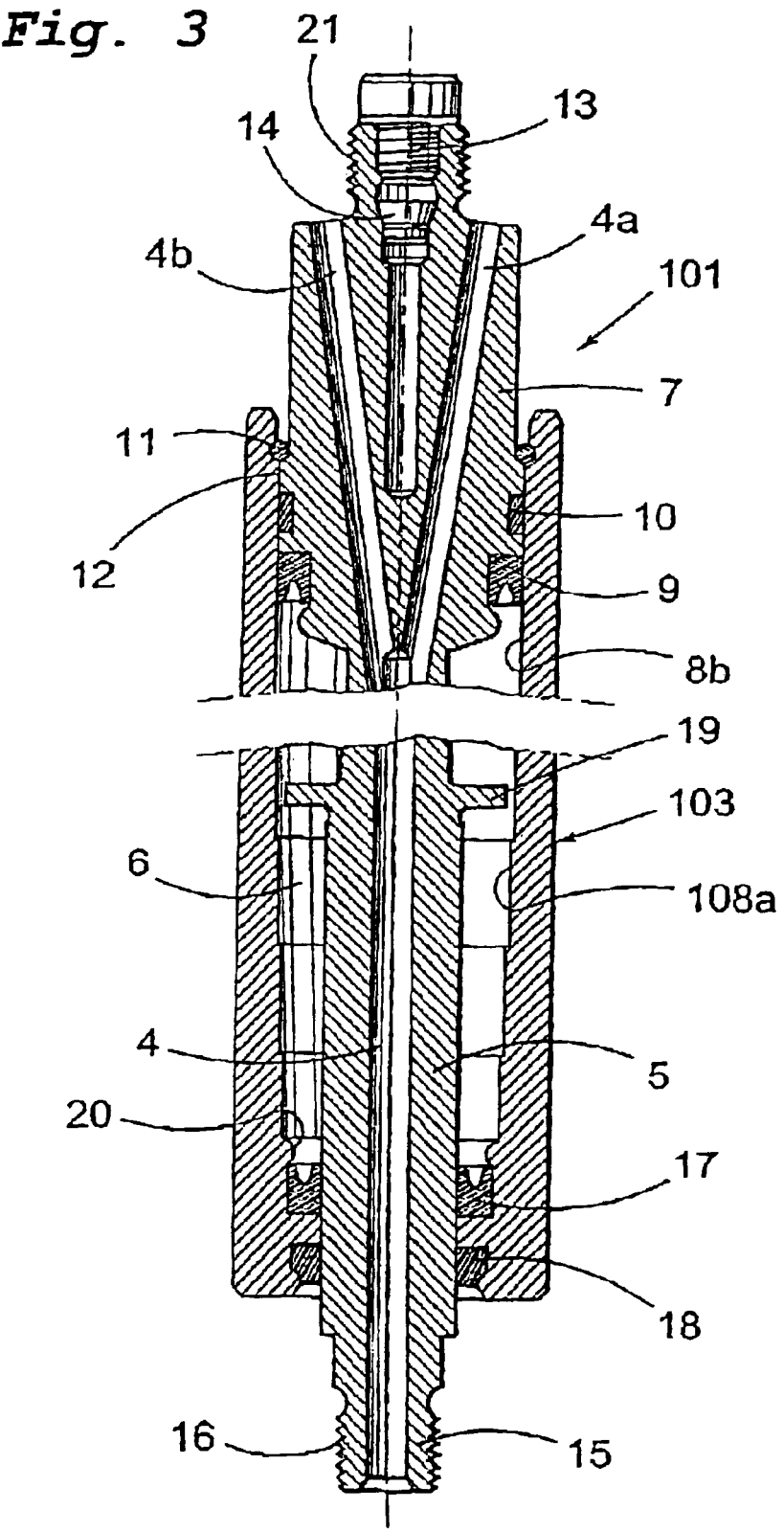
FIG. 3 shows a longitudinal cross-section through a second embodiment of a gas spring according to the present invention.

In FIG. 3, an alternative embodiment of a gas spring 101 according to the present invention is shown. The parts of the gas spring 101 that are in principle identical with the corresponding parts of the gas spring 1 have been given the same reference designations.

The essential difference between the gas spring 101 and the gas spring 1 is the design of the housing 103 in comparison with the housing 3. The lower portion 8a of the chamber surface of the housing 3 is a smooth conical surface which widens continuously in the upwards direction in FIG. 1, whereas the lower portion 108a of the chamber surface of the housing 103, widens upwardly in steps and not continuously, in FIG. 3. The upper surface portion 8b of the housing 103 is cylindrical correspondingly as in the embodiment according to FIG. 1.

FEASIBLE MODIFICATIONS OF THE INVENTION

In the embodiments described above, certain details have been given for the interaction of the gas spring 1; 101 with other components included in a machine spindle. However, these details may be formed in multiple ways, without therefore deviating from the principle of the present invention.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A gas spring comprising:
   a housing forming a chamber;
   a piston defining a longitudinal axis and including a head disposed within a first end portion of the chamber for sliding movement therein along the axis, and a rod fixedly connected to and projecting axially from the head and extending through a second portion of the chamber and emerging from the chamber;
   a lubricant-containing gas medium contained within the chamber to be compressed by the head in response to movement of the head toward the second end portion of the chamber;
   wherein the first end portion of the chamber is defined by a cylindrical surface, and the second end portion of the chamber in which lubricant-containing gas medium is disposed is defined by a non-cylindrical surface that widens toward the first end portion of the chamber.

2. The gas spring according to claim 1 wherein the non-cylindrical surface is smoothly conically shaped.

3. The gas spring according to claim 2 wherein the conically shaped surface forms a cone angle in the range 0.2–4.0°.

4. The gas spring according to claim 1 wherein the non-cylindrical surface widens in steps.

5. The gas spring according to claim 1 wherein the piston carries a seal which engages the cylindrical surface of the chamber.

6. The gas spring according to claim 5 wherein the rod emerges from the chamber through a seal member carried by the housing, the rod being in sealing contact with the seal member, wherein the non-cylindrical surface is disposed between the seal member and the head.

7. The clamping device according to claim 1 wherein the piston carries a seal which engages the cylindrical surface of the chamber.

8. The clamping device according to claim 7 wherein the rod emerges from the chamber through a seal member carried by the housing, the rod being in sealing contact with the seal member, wherein the non-cylindrical surface is disposed between the seal member and the head.

9. A clamping device comprising:
   a drawbar defining a longitudinal axis;
   tool-clamping members arranged at a lower end of the drawbar; and
   a gas spring comprising:
   a housing forming a chamber;
   a piston including a head disposed within an upper end portion of the chamber for sliding movement therein along the axis, and a rod fixedly connected to and projecting axially from the head and extending through a lower portion of the chamber and emerging downwardly from the chamber and fixedly connected to a lower end of the drawbar; and
   a lubricant-containing gas medium contained within the chamber to be compressed by the piston in response to downward movement of the head;
   wherein the upper end portion of the chamber is defined by a cylindrical surface, and the lower end portion of the chamber in which lubricant-containing gas medium is disposed is defined by a non-cylindrical surface that widens upwardly.

10. The clamping device according to claim 9 wherein the non-cylindrical surface is smoothly conically shaped.

11. The clamping device according to claim 10 wherein the conically shaped surface forms a cone angle, in the range 0.2–4.0°.

12. The clamping device according to claim 9 wherein the non-cylindrical surface widens in steps.

13. A machine spindle comprising:
    a casing rotatable about a vertical axis; and
    a clamping device mounted in the casing and comprising:
    a drawbar extending along the axis;
    tool-clamping members arranged at an upper end of the drawbar; and
    a gas spring including:
    a housing forming a chamber;
    a piston including a head disposed within an upper end portion of the chamber for sliding movement therein along the axis, and a rod fixedly connected to and projecting axially from the head and extending through a lower portion of the chamber and emerging downwardly from the chamber and connected to a lower end of the drawbar; and
    a lubricant-containing gas medium contained within the chamber to be compressed by the piston in response to downward movement of the head;
    wherein the upper end portion of the chamber is defined by a cylindrical surface, and the lower end portion of the chamber in which lubricant-containing gas medium is disposed is defined by a non-cylindrical surface that widens upwardly.

14. The machine spindle according to claim 13 wherein the non-cylindrical surface is smoothly conically shaped.

15. The machine spindle according to claim 14 wherein the conically shaped surface forms a cone angle in the range 0.2–4.0°.

16. The machine spindle according to claim 13 wherein the non-cylindrical surface widens in steps.

17. The machine spindle according to claim 13 wherein the piston carries a seal which engages the cylindrical surface of the chamber.

18. The machine spindle according to claim 17 wherein the rod emerges from the chamber through a seal member carried by the housing, the rod being in sealing contact with the seal member, wherein the non-cylindrical surface is disposed between the seal member and the head.

19. A gas spring comprising:
    a housing forming a chamber;
    a piston defining a longitudinal axis and including a head disposed within a first end portion of the chamber foe sliding movement therein along the axis, and a rod projecting axially from the head and extending through a second portion of the chamber and emerging from the chamber;
    a lubricant-containing gas medium contained within the chamber to be compressed by the head in response to movement of the head toward the second end portion of the chamber;
    wherein the first end portion of the chamber is defined by a cylindrical surface, and the second end portion of the chamber is defined by a smoothly conically shaped surface that widens toward the first end portion of the chamber.

20. A clamping device comprising:
    a drawbar defining a longitudinal axis;
    tool-clamping members arranged at an upper end of the drawbar; and
    a gas spring comprising:
    a housing forming a chamber;

a piston including a head disposed within an upper end portion of the chamber for sliding movement therein along the axis, and a rod projecting axially from the head and extending through a lower portion of the chamber and emerging downwardly from the chamber and connected to a lower end of the drawbar; and a lubricant-containing gas medium contained within the chamber to be compressed by the piston in response to downward movement of the head;

wherein the upper end portion of the chamber is defined by a cylindrical surface, and the lower end portion of the chamber is defined by a smoothly conically shaped surface that widens upwardly.

21. A machine spindle comprising:

a casing rotatable about a vertical axis; and a clamping device mounted in the casing and comprising:
 a drawbar extending along the axis;
 tool-clamping member arranged at an upper end of the drawbar; and
 a gas spring including:
  a housing forming a chamber;
  a piston including a head disposed within an upper end portion of the chamber for sliding movement therein along the axis, and a rod projecting axially from the head and extending through a lower portion of the chamber and emerging downwardly from the chamber and connected to a lower end of the drawbar; and
  a lubricant-containing gas medium containing within the chamber to be compressed by the piston in response to downward movement of the head;
  wherein the upper end portion of the chamber is defined by a cylindrical surface, and the lower end portion of the chamber is defined by a smoothly conically shaped surface that widens upwardly.

* * * * *